UNITED STATES PATENT OFFICE.

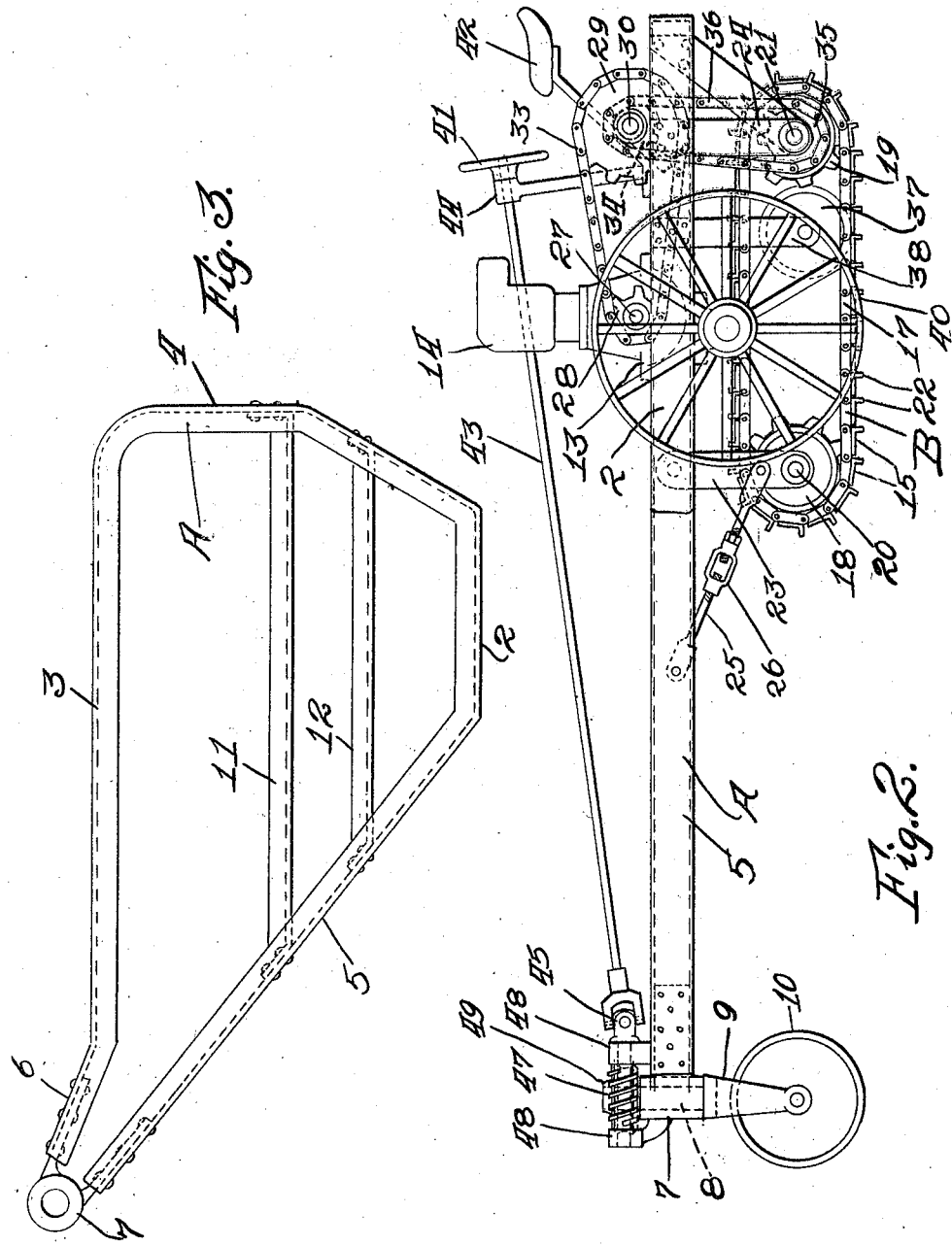

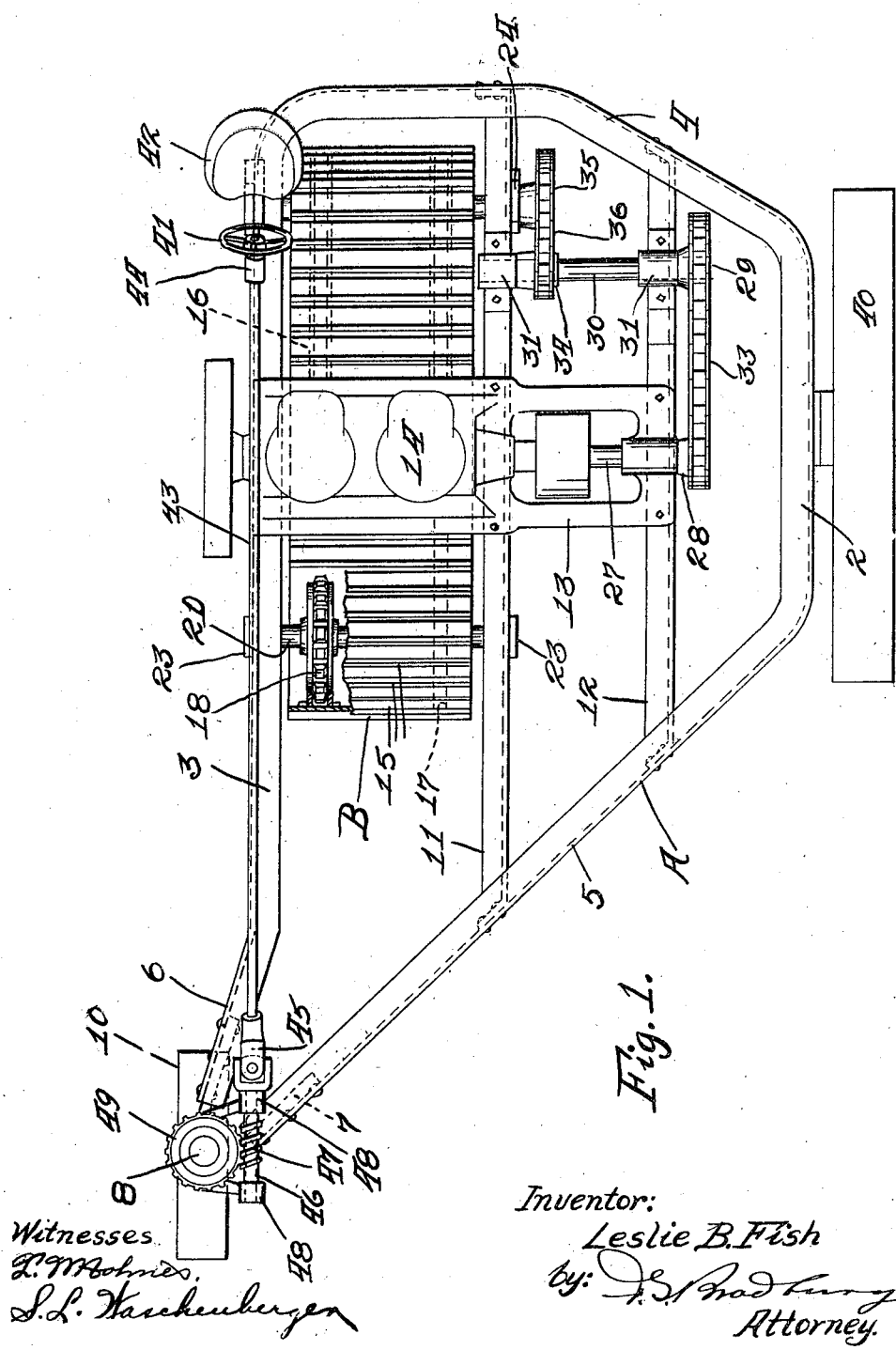

LESLIE B. FISH, OF ST. PAUL, MINNESOTA.

TRACTOR.

1,260,259. Specification of Letters Patent. Patented Mar. 19, 1918.

Application filed April 12, 1915. Serial No. 20,714.

*To all whom it may concern:*

Be it known that I, LESLIE B. FISH, a citizen of the United States, residing at St. Paul, in the county of Ramsey and State of Minnesota, have invented a new and useful Improvement in Tractors, of which the following is a specification.

My invention relates to improvements in tractors, and has for its primary object the production of a simple and inexpensive power vehicle, which is adapted for general farm utility work. More particularly this invention relates to the frame structure upon which the power and steering elements are mounted, whereby the device is most effectively driven, the power most efficiently transmitted to the propelling element and the vehicle most easily steered. The invention further is of light weight and adapted to consume a comparatively small amount of power in its operation. It is therefore serviceable in soft fields for plowing, seeding, harvesting and other work or on the road for hauling heavy loads of grain or other material.

The invention also combines into the frame as a substantially unitary structure, the parts of the vehicle, in such manner as to encompass them within small dimensions, thus coöperating in supporting the load and compensating lateral and vertical efforts without depreciating efficiency in the transmission of power. The invention also provides by the arrangement of its parts a stable support while the vehicle is traveling over rough or soft ground and making short turns. It also provides sufficient rigidity to maintain the parts in free working alinement, thus minimizing friction. With the above and other objects in view, the invention consists of the novel construction and combination and arrangement of parts hereinafter fully described, claimed and illustrated by the accompanying drawings.

In the drawings, forming part of this specification, Figure 1 is a plan of my invention; Fig. 2 is a side elevation, and Fig. 3 is a plan of the frame.

In the drawings, A represents the frame of the vehicle, which is of skeleton form, the margin being made out of a single piece of channel iron bent between its ends to produce two parallel sides 2 and 3 and a rear yoke member 4. The ends of the piece of channel iron converge toward each other and terminate in a portion offset from one side of the frame, the end member 5 thus formed traversing the front portion of the frame diagonally in a forward direction from the side 2 toward said offset and the member 6 slanting outwardly and forwardly from the side of the frame. To the extremities of said ends is secured a socket fixture 7 in which is swiveled the vertical shaft 8 on a steering fork 9, carrying the steering wheel 10. The body of the frame is reinforced by longitudinal braces 11 and 12 made out of angle iron and bolted across said braces and to the side 3 is the base 13 of the prime mover 14, which is in the form of an internal combustion engine. By securing said base to the side 3 and braces 11 and 12 the parts of the frame are buttressed and rigidly united.

Arranged below the frame near the side 3 and brace 11 is what I have chosen to term a caterpillar drive B, which propels the vehicle forwardly or backwardly. This caterpillar drive consists of a plurality of articulated members in the form of shoe plates 15, which are secured across chain belts 16 and 17, said chain belts passing over pairs of sprocket wheels 18 and 19, which are mounted upon shafts 20 and 21. Each of the shoe plates 15 is formed with an outwardly extending flange 22, the flanges of said shoe plates being adapted to engage the ground to most effectively propel the vehicle. The shaft 20 carrying the sprockets 18 is freely journaled in the lower ends of link members 23, which are hung from the side 3 and brace 11 of the frame while the shaft 21, which is driven is journaled in the lower end of a depending bracket element 24 rigidly fastened to the frame. In this manner a belt carrying the propelling shoe elements is provided, the lower lap of which is adapted to engage and travel over the surface of the ground. The swinging arms 23 are pivotally secured by the rods such as 25 to the frame, a turn buckle such as 26 being employed in said rod for the purpose of adjusting its length, whereby the belt carrying said shoe plates can be tightened or loosened to most effectively cause the shoes to propel the vehicle. The line of draft of the caterpillar drive is in a directly forward direction parallel to the side 3 of the frame, while the drive shaft 27 of the engine 14 lies transverse to said line of draft. This main drive shaft is connected with the shaft 21 of the caterpillar drive by the following members:

Motion is first transmitted from a drive sprocket 28 on the shaft 27 to a driven sprocket 29 on a counter shaft 30, which is journaled by the journal blocks 31 on the frame by means of a chain belt 33. This countershaft in turn transmits motion to the shaft 21 by a sprocket 34 on the countershaft to a sprocket 35 on the shaft 21, by means of the chain belt 36. In this manner power is applied to the caterpillar drive with a minimum amount of loss due to friction, no bevel gearing being employed and no differential mechanism being required, which are usually inefficient. For the purpose of holding the lower side of the belt of the caterpillar drive applied with the shoe flanges firmly inserted in the ground, an idle roller 37 is freely journaled on the depending support 38 from the frame with its periphery pressing against the inner surfaces of the shoe plates, and serving to prevent the lower side of the belt being urged upwardly out of engagement with the ground.

Disposed on one side of the body of the frame adjacent the side member 2 is an idle carrier wheel 40, the axis of which is parallel to the axes of the shafts 20 and 21. The axis of the carrier wheel 40 upon which said wheel is journaled is carried by the side 2 of the frame and the line of draft of said idle wheel is directly forward parallel with the line of draft of the caterpillar drive. This idle wheel 40 supports the weight of one side of the frame and is free to turn with the frame when the vehicle is steered. The direct line of draft of the steering wheel when the vehicle is moving straight ahead, is also parallel with the direct forward line of draft of the caterpillar drive and parallel therewith, but on the opposite side of the caterpillar drive from that of the carrier wheel 40. The steering wheel being positioned on an offset forward extension of the frame most effectively stabilizes the frame and prevents it from tipping when the vehicle is traveling over rough and hilly ground.

The steering of the steering wheel 10 is accomplished by turning the hand wheel 41 from the seat 42 on the frame, said steering wheel being carried by a longitudinal steering shaft 43, which is journaled at one end on the post 44, carried by the frame and secured by a universal joint 45 to a shaft 46, which carries a worm pinion 47. The shaft 46 is journaled in the supports 48 secured to the fixture 7 and the teeth of the worm pinion mesh with the teeth of a worm gear 49, which is mounted upon the upper end of the steering wheel shaft 8. The arrangement of the caterpillar drive in the frame and of the points at which said frame is supported as described, maintains the conveyance in equilibrium when traveling over rough hilly ground and enables the steering and directing of the vehicle around sharp turns easily. The frame thus provides a unitary structure, which is adapted to most effectively carry the working parts of the tractor in the most economical manner.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention what I claim as new and desire to protect by Letters Patent is:

1. A traction engine comprising a unitary skeleton frame having an integral forward reach extending laterally therefrom, a forward steered guiding wheel swiveled from the outer extremity of said reach, a plurality of spaced members extending longitudinally of said frame for bracing the same, a drive wheel extending below the body of said frame at the rear of and entirely to one side of said steered wheel, a following idle carrier wheel below the body of said frame and disposed on the opposite side of said drive wheel from said steered wheel, and a motor carried by said frame directly above said drive wheel for propelling said wheel.

2. A tractor comprising a unitary frame, having a forward steered guiding wheel, a flexible driving element extending below the body of the frame and the rear portion thereof, a balancing idle carrier wheel disposed at one side of said frame, and a motor carried by said frame in a position directly over said driving element to most effectively propel the same.

In testimony whereof, I have signed my name to this specification in the presence of two subscribing witnesses.

LESLIE B. FISH.

Witnesses:
STELLA L. WASCHENBERGER,
F. G. BRADBURY.